(12) United States Patent
Orr

(10) Patent No.: US 7,152,336 B2
(45) Date of Patent: Dec. 26, 2006

(54) TOOL FOR MEASURING COMPLIANCE WITH BUILDING CONSTRUCTION CODES

(76) Inventor: Mark Andrew Orr, 303 Fox Valley Dr., Longwood, FL (US) 32779

( * ) Notice: Subject to any disclaimer, the term of this patent is extended or adjusted under 35 U.S.C. 154(b) by 0 days.

(21) Appl. No.: 10/914,896

(22) Filed: Aug. 10, 2004

(65) Prior Publication Data

US 2006/0032067 A1 Feb. 16, 2006

(51) Int. Cl.
*G01B 5/14* (2006.01)
*G01B 5/08* (2006.01)

(52) U.S. Cl. .................. 33/501.08; 33/1 BB; 33/494; 33/555.2

(58) Field of Classification Search .............. 33/501.08, 33/501.09, 501.1, 501.2, 501.3, 501.4, 501.5, 33/501, 562, 563, 567, 567.1, 1 BB, 1 G, 33/27.03, 451, 458, 452, 494, 809, 810, 555.1, 33/555.2, 566; D10/64, 65, 70, 71
See application file for complete search history.

(56) References Cited

U.S. PATENT DOCUMENTS

| 640,448 | A | * | 1/1900 | Cox, Jr. .................. 33/501.3 |
| 1,389,486 | A | * | 8/1921 | Brewer ..................... 33/562 |
| 1,638,885 | A | * | 8/1927 | Shea ........................ 33/567 |
| 2,817,892 | A | | 12/1957 | Jones |
| 4,150,488 | A | * | 4/1979 | Behnke ..................... 33/567 |
| D259,026 | S | * | 4/1981 | Thornton ................... D10/64 |
| 4,499,666 | A | * | 2/1985 | Smith ....................... 33/562 |
| 4,958,814 | A | | 9/1990 | Johnson |
| 5,179,787 | A | * | 1/1993 | Ostrowski ................. 33/613 |
| 5,212,890 | A | | 5/1993 | White et al. |
| D337,535 | S | * | 7/1993 | Knowlton ................... D10/64 |
| D356,513 | S | * | 3/1995 | Burkholder, II ............. D10/64 |
| D366,844 | S | * | 2/1996 | Schroeder et al. ........... D10/64 |
| 5,490,334 | A | | 2/1996 | Payne |
| 5,491,905 | A | * | 2/1996 | Jablonski et al. ............ 33/613 |
| 5,515,614 | A | * | 5/1996 | Wing ....................... 33/548 |
| D379,155 | S | * | 5/1997 | Bond ........................ D10/64 |
| 5,878,502 | A | * | 3/1999 | Donahue, Jr. ............... 33/374 |
| D411,808 | S | * | 7/1999 | Irwin ....................... D10/65 |
| 6,070,336 | A | | 6/2000 | Rodgers |
| D445,348 | S | * | 7/2001 | Trainor ..................... D10/64 |
| 6,381,908 | B1 | | 5/2002 | Fisher |
| 6,385,859 | B1 | | 5/2002 | Varney |
| D462,282 | S | * | 9/2002 | Salvagno ................... D10/65 |
| 7,073,272 | B1 | * | 7/2006 | Lefebvre ................... 33/600 |
| 2003/0140571 | A1 | * | 7/2003 | Muha et al. ............... 52/79.1 |
| 2004/0003507 | A1 | * | 1/2004 | Jordan et al. ............... 33/566 |
| 2005/0257391 | A1 | * | 11/2005 | Driscoll .................... 33/566 |
| 2006/0032067 | A1 | * | 2/2006 | Orr ........................ 33/501.08 |

FOREIGN PATENT DOCUMENTS

DE 3414216 A1 * 10/1985

* cited by examiner

*Primary Examiner*—R. Alexander Smith
(74) *Attorney, Agent, or Firm*—Robert L. Wolter, Esq.; Beusse Wolter Sanks Mora & Maire, P.A.

(57) ABSTRACT

A tool for measuring compliance with building construction codes comprises at least one indentation having a diameter that is representative of a maximum or minimum diameter of a handrail or grab bar, as permitted by code standards. The indentation is positioned adjacent a handrail or grab bar to determine compliance with relevant code standards. The tool may also include a tab positioned adjacent The indentation to simultaneously measure the distance a grab bar or handrail is spaced from a wall, and the diameter of the handrail or grab bar.

12 Claims, 9 Drawing Sheets

TOOL FOR MEASURING COMPLIANCE WITH BUILDING CONSTRUCTION CODES

FIELD OF THE INVENTION

This invention relates to the measurement of spatial dimensions for access areas of buildings and for washroom fixtures and accessories to determine compliance with construction codes and regulations.

BACKGROUND OF THE INVENTION

Various state and federal regulations or codes govern spatial dimension requirements for construction of building access areas and/or washrooms. Such codes provide minimum and/or maximum dimensions for various components of access areas and washrooms such as handrails for staircases, ramps, guardrails or grab bas in washrooms, stalls, etc. Laborers or contractors may determine compliance with these codes by using various well-known measuring tools, such as rulers or tape measures.

However, using such measuring devices can be awkward for measurement of particular items, such as the diameter of handrails or grab bars. In addition, such standard measuring tools do not include references to the relevant codes. The laborer must have either have memorized the codes or have an available copy for reference.

SUMMARY OF THE INVENTION

The present invention is for a tool for measuring and/or determining compliance with codes that set forth the standards for spatial dimensions of building access areas and washroom fixtures and accessories. The field tool comprises a planar member having an outer edge extending along a fist face and an opposing and substantially parallel second face. At least one indentation is formed along the outer edge and extends through the first face and second face wherein the indentation is capable of receiving a handrail or grab bar, extending transversely with respect to the first face and second face of the planar member. The indentation may have a diameter representative of a maximum diameter for handrails or grab bars permitted by code, or a diameter that is representative of a minimum diameter for handrails or grab bars permitted by the code, in order to measure the diameter and/or determine compliance with the relevant codes. The term code is used synonymously with the word "regulation," and is intended to cover any standard adopted by any agency, private or public, that sets forth standards with respect to spatial dimensions of a building area.

The term measure as used in this disclosure may include regulating compliance with a standard, and is used synonymously with "determining compliance with." The field tool, in some cases may not provide an exact measurement of a component or feature, but the tool may measure whether a spatial dimension is within a code standard.

In an exemplary embodiment, the tool includes a tab positioned adjacent to the indentation. The tab has a width that is representative of a minimum distance a grab bar may be spaced from a wall, or stall panel, in a washroom. The indentation and tab are preferably oriented with respect to one another so the tool can simultaneously determine compliance with regulations with respect to the diameter of a grab bar and the distance the grab bar is spaced from a washroom wall.

In addition, the tool may have a predetermined width measured at spaced points along the outer edge of the planar member. This predetermined width is representative of a maximum opening between consecutive intermediate rails on a guardrail may be spaced apart, and/or openings in an ornamental design of a guardrail.

In yet another exemplary embodiment, the planar member is elongated having a first end and a second end. The planar member has a plurality of indicia marked on a first face or an opposing second face of the planar member, which indicia are representative of code standards. The indicia are typically marked a predetermined distance from either the first end or second end of the elongated planar member, or the indicia may be spaced from one another to represent a spatial dimension or requirements of relevant codes.

DETAILED DESCRIPTION OF THE DRAWINGS

Figure 1:
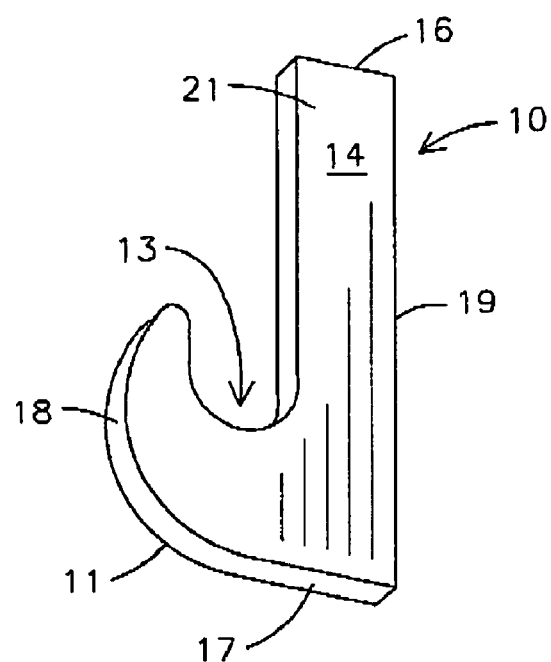
FIG. 1 is a perspective view of a an exemplary embodiment of the invention.
Figure 2:
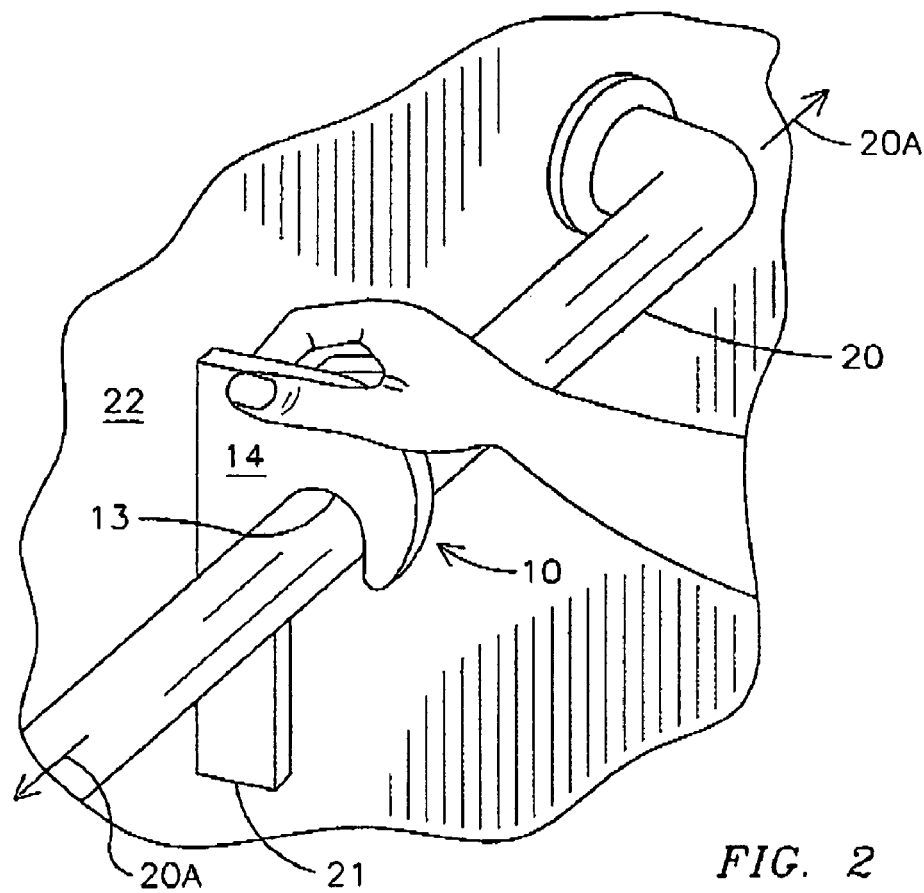
FIG. 2 is a perspective view of the invention used to simultaneously measure the diameter of a grab bar and the distance from the grab bar to a washroom wall.

In an exemplary embodiment, the field tool 10 for measuring spatial dimensions associated with access areas for buildings and washroom fixtures and accessories, and determining compliance with codes and regulations, such as the regulations adopted pursuant to the American Disabilities Act, is shown in FIGS. 1 and 2. In this embodiment, the field tool 10 comprises a planar member having an outer edge extending along a first face 14 and a second face 15 (not shown) that is opposing and substantially parallel to the first face 14. At least one indentation 13 is disposed along the outer edge and extends through the first face 14 and second face 15. The shape of the indentation is semicircular corresponding to the shape of a handrail or grab bar; however, the invention is not limited to a semicircular-shaped indentation. The semicircular configuration is provided simply for purposes of describing a disclosed embodiment of the invention. Handrails as used in this specification shall refer to the handrails for stairs, ramps or on a guardrail, as distinguished from grab bars, which are mounted on washroom walls.

Figure 1A:
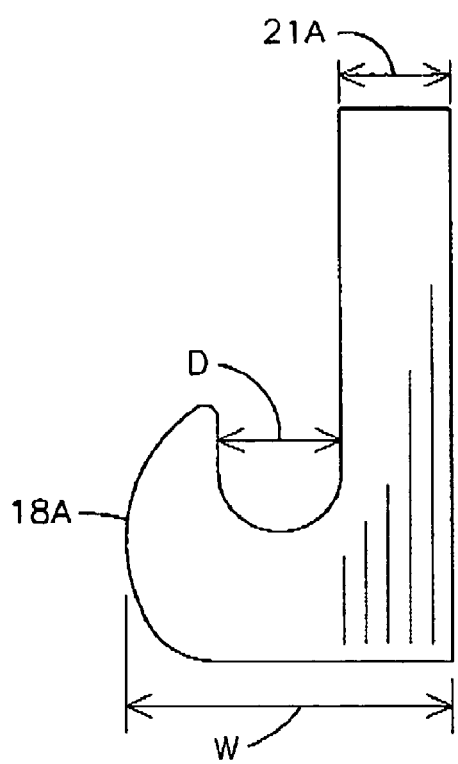
FIG. 1A is a elevational view of the invention.

The indentation 13 is capable of receiving a handrail or grab bar. With respect to FIG. 2, the tool 10 is shown in use whereby the indentation is placed over and receiving grab bar 20, which has a longitudinal axis 20A extending transversely with respect to the faces 14 and 15 (not shown) of the tool 10. With respect to FIG. 1A, The indentation 13 has a diameter D that is representative of either a maximum diameter of a handrail or grab bar, or a diameter that is representative of a minimum diameter of a handrail or grab bar as permitted by relevant codes.

For example the ADA regulations require a minimum diameter of 1¼ inches, and, a maximum diameter of 1½ inches, for handrails and grab bars. The tool 10 does not necessarily provide an exact diameter measurement of the diameter of the grab bar 20, but provides an indication of whether the grab bar 20 diameters complies with code standards. If the indentation 13 diameter D represents a maximum diameter as permitted by code, and the gab bar 20 does not fit within the indentation 13, then the grab bar 20 does not comply with code standards.

With respect to FIG. 1, the formation of the indentation tool 13 preferably creates a measuring tab 21 that is positioned adjacent the indentation 13. In the exemplary embodiment shown in FIG. 1, an outer edge that consists of a top edge 16, bottom edge 17 and two side edges 18 and 19. The tab 21 has a predetermined width, indicated by line 21A, which is representative of a minimum distance a grab bar 20 may be spaced from a washroom wall or a washroom stall panel. For example, the ADA regulations require a grab bar to be spaced at least 1-½ inches from a bathroom wall or stall panel. For convenience of describing and claiming this invention, the term washroom wall as used herein shall include a washroom stall panel.

The measuring tab 21 and indentation 13 are preferably oriented with respect to one another so that compliance with codes governing the grab bar 20 diameter, and the distance a grab bar 20 is spaced from a washroom wall 22, can be determined simultaneously. With respect to FIG. 2, the tool 10 is illustrated measuring a grab bar 20 diameter and the distance the grab bar 20 is spaced from a washroom wall 22. The tool 10 is positioned so the tab 21 is inserted between the grab bar 20 and wall 22, and indentation 13 fits over the grab gar 20. In this manner, the compliance with respect to the above referenced codes as to grab bar diameter, and grab bar spacing from a washroom wall, can be measured simultaneously.

Figure 5:
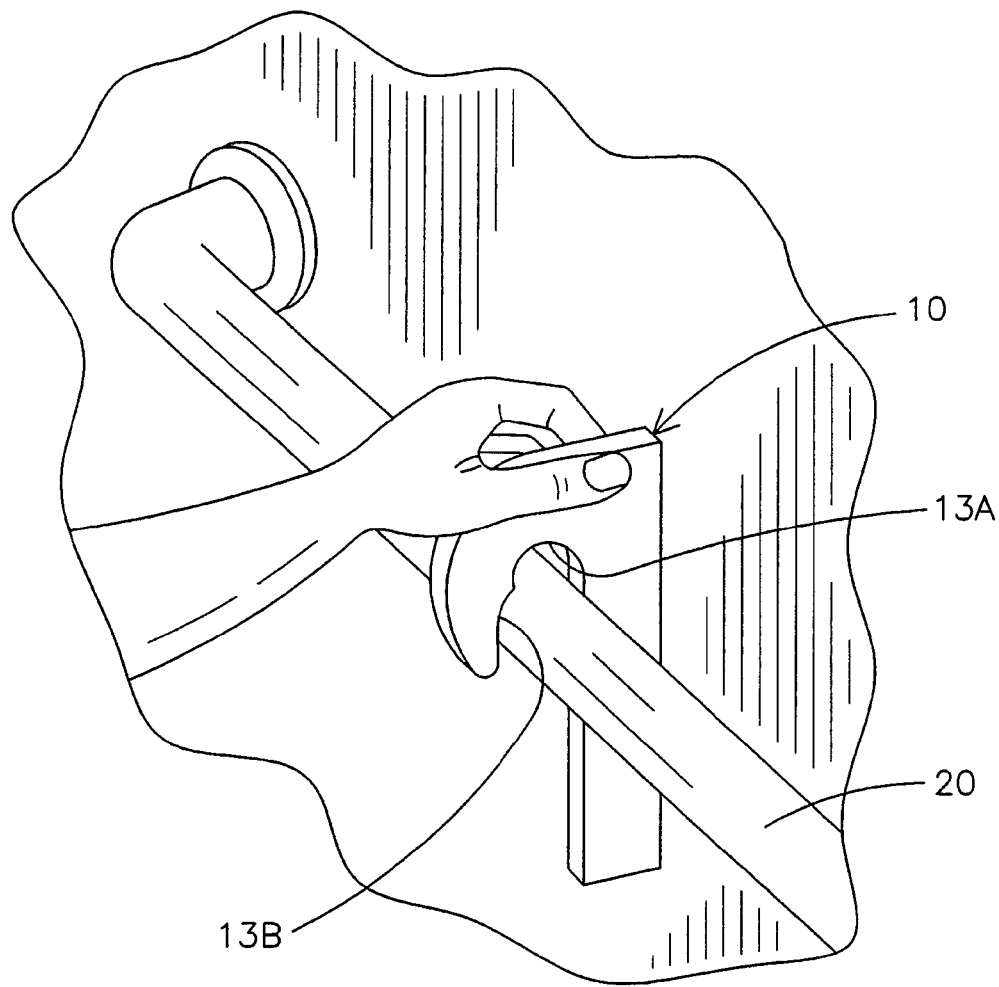
FIG. 5 is a front elevational view of the embodiment of FIG. 4 used to measure a grab bar or handrail.

In addition, the tool 10 may be used to determine compliance with a third code standard that relates to intermediate rails of a guardrail 25, as shown in FIG. 5. With respect to FIG. 1A, the tool 10 has a predetermined width W that is representative of a maximum distance between consecutive intermediate rails of a guardrail or the size openings on an ornamental pattern on a guardrail 25. For example the ADA regulations require that guardrails have intermediate rails or ornamental patterns such that a four inch sphere may pass Through any opening.

Figure 3:
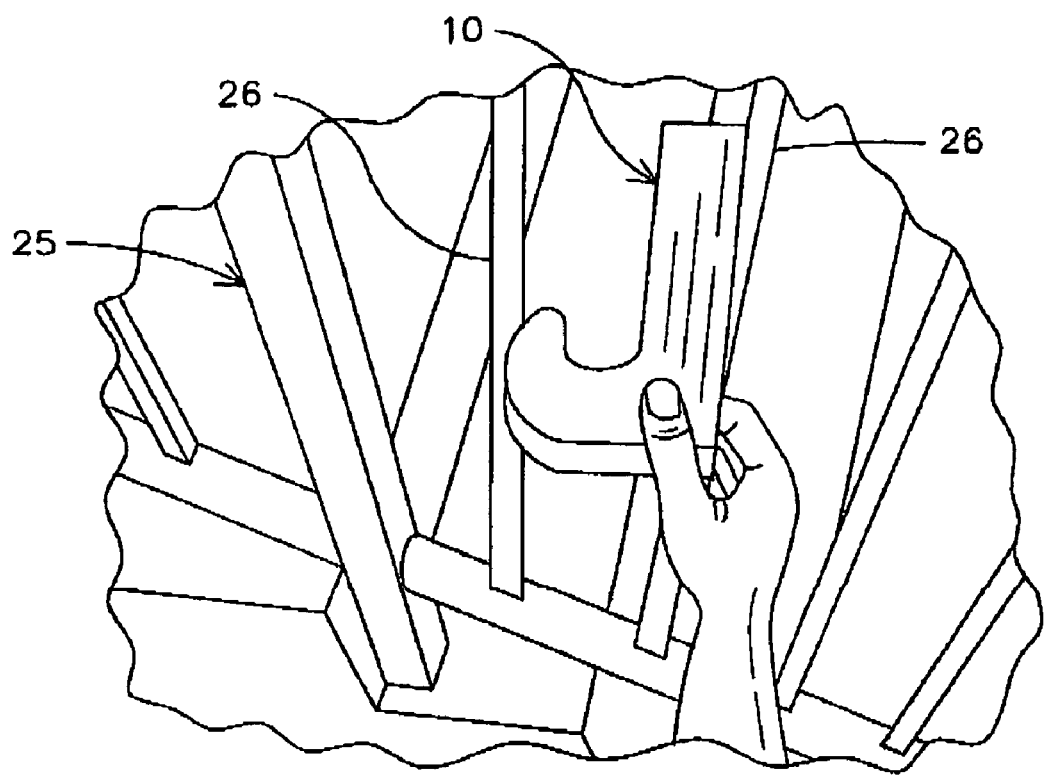
FIG. 3 is a perspective view of the invention used to measure compliance of the spacing between consecutive intermediate rails on a guardrail

The width W is measured between two spaced apart points on the outer edge of the planar member. In the embodiment illustrated in FIGS. 1 through 3, tho width W is measured from a point on side edge 18 to a point on side edge 19. The side edge 18 is tapered inward toward the indentation 13 from a point 18A from which the width W is determined. As shown in FIG. 3, the tapered end of the edge 18 is inserted between intermediate rails, and if the intermediate rails 26 are spaced less than four inches apart, the tool 10 should engage the intermediate rails 26 at, or before reaching, point 18A. The tool 10 may be placed in an opening on an ornamental design and rotated to form a sphere to determine compliance with relevant codes.

Figure 4:
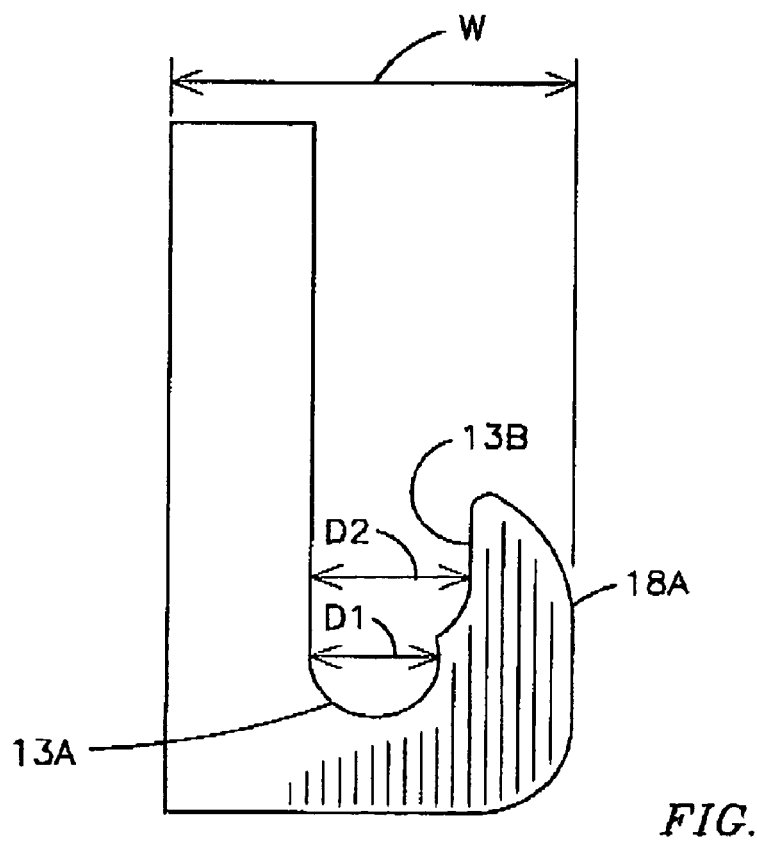
FIG. 4 is a font elevational view of an exemplary embodiment of the invention.

In another exemplary embodiment the tool 10 may have two indentations including the first indentation 13A and second indentation 13B as shown m FIG. 4. The first indentation 13A has a diameter D1 representative of a minimum diameter of a handrail or grab bar as permitted by code, and the second indentation 131 has a diameter D2 that is representative of a maximum diameter of a handrail or grab bar. In the exemplary embodiment illustrated in FIG. 4, the first indentation 13A and second indentation 13B overlap one another in order to simultaneously determine compliance within the maximum and minimum diameters of handrails or grab bars as permitted by code.

With respect to FIG. 5, the tool 10 is shown measuring a grab bar 20 than is compliant with the relevant code. The grab bar 20 fits within the second indentation 13B as its diameter is equal to or less than the maximum diameter requirement, and does not fit within the first indentation 13A, as the rail diameter meets the minimum diameter requirement.

Figure 6A:
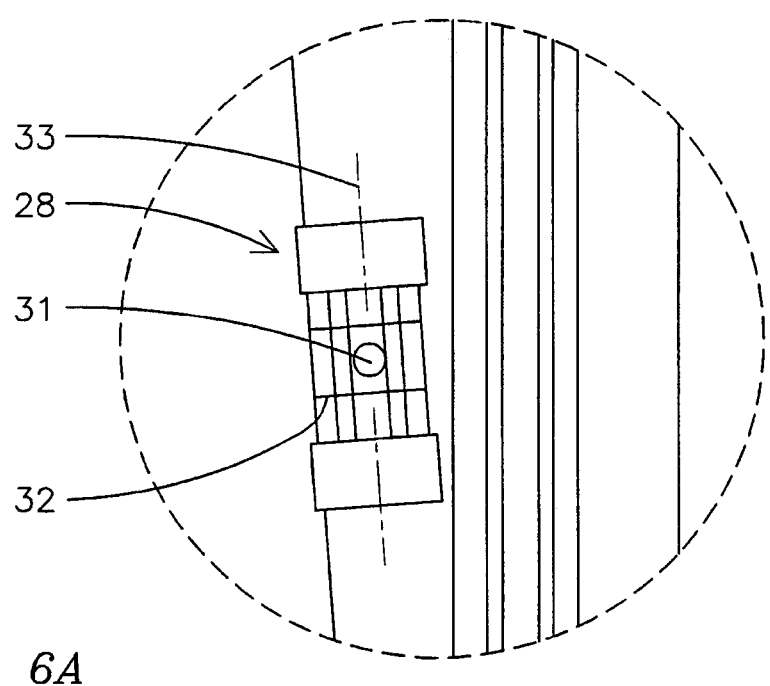
FIG. 6A is an expanded view of a level used on the invention.
Figure 6:
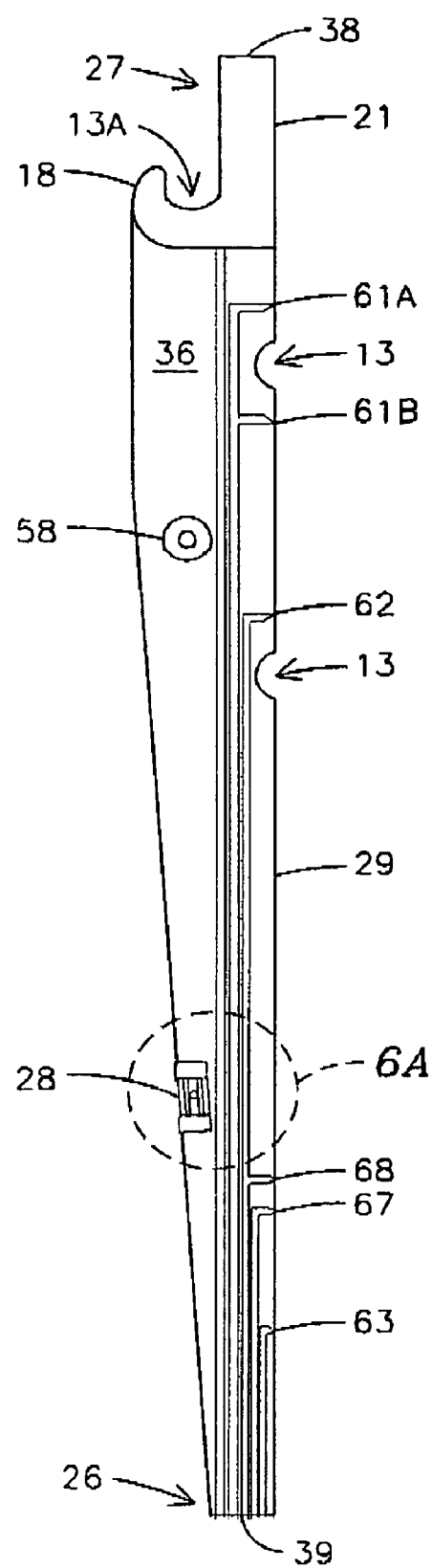
FIG. 6 is a front elevational of an exemplary embodiment of the invention bearing code indicia for access areas to a building.
Figure 7:
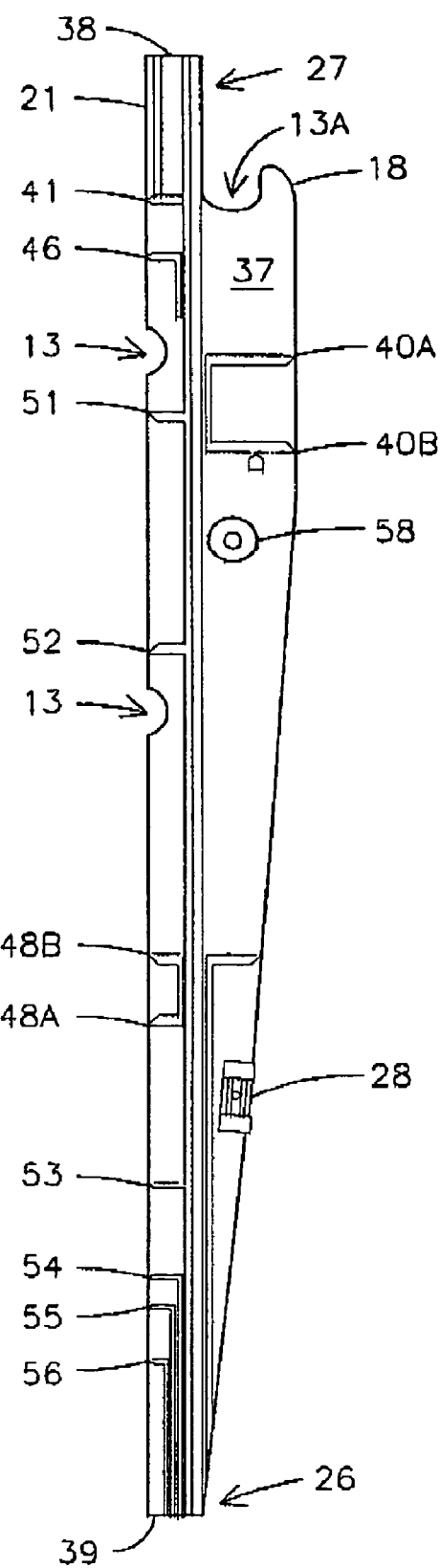
FIG. 7 is a rear elevational view of an exemplary embodiment of the invention bearing code indicia for washroom fixtures and accessories.

In another embodiment shown in FIGS. 6 and 7, the field tool 10 includes and elongated planar member 35 having a first end 26 and a second end 27 interconnected by a straight side edge 29. One or more indentations 13 are formed on the tool 11, and are representative of either a minimum diameter or a maximum diameter for handrails or grab bars. In the exemplary embodiment shown in FIGS. 1 and 2, the indentations 13 are shown formed along the straight side edge 29. In addition, an indentation 13A is formed at the second end of the tool 10.

As shown in FIGS. 6 and 7, the second end 27 has an indentation 13A and tab 21 as described above for simultaneously measuring the grab bar 20 or handrail ; 23 diameter and their spacing from the wall. In addition, the second end 27 has the tapered edge 18 for measuring the baluster 26 spacing as described above.

A level 28 is mounted on the tool 10 at an angle with respect to the straight side edge 29. The level, as shown in FIG. 6A, is a typical level instrument including a tube 30 encasing a fluid, moveable air bubble 31 and bubble lines 32 in order to determine whether a surface or edge is level, or in the present invention to determine if the slope of a ramp is within a predetermined range. A longitudinal axis 33 of the tube 30 is positioned at an angle with respect to the side edge 29, which angle may be representative of a maximum slope of a building access ramp surface as permitted by code. For example, ADA regulations require that a slope of an access ramp, as shown in FIG. 16, may not exceed a 1:12 ratio.

Figure 16:
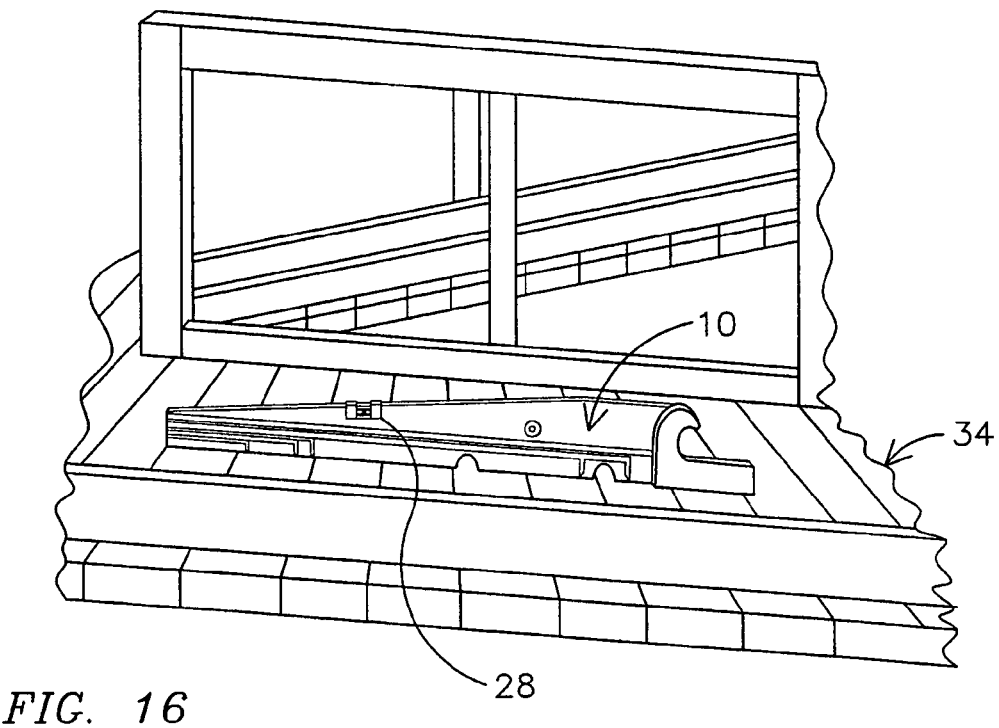
FIG. 16 is a perspective view of the invention used to measure slope of an access ramp.

As shown in FIG. 16, the tool 10 is positioned on a ramp 34 so that the straight edge 16 abuts the ramp 34 surface. If the ramp 34 is disposed at the acceptable angle that is equal to or less than the maximum ratio of 1:12, then the air bubble 31 should disposed between the lines 32 or to one side of the lines depending on the orientation of the tool 10 on the ramp 34.

With respect to FIGS. 6 and 7, the tool 10 includes a first face 36 and second face 37, opposing and substantially parallel to the fist face 36. Each face 36 and 37 display various indicia representative of spatial dimension code standards. In the exemplary embodiment described herein, those indicia representative of code standards relating to building access areas are displayed the first face 36, as shown in FIG. 6, and the indicia representative of code standards relating to washroom fixtures and accessories are displayed on the second face 37. The indicia may be positioned on the tool 10 a predetermined distance measured either from a straight edge 38 of the first end 26 or a straight edge 39 on the second end 27 of planar member, and the predetermined distance being representative of a construction code standards Alternatively, the indicia may be spaced apart a predetermined distance with respect to one another, and the predetermined distance between the indicia is representative of a construction code standard. In addition, the indicia may be marked with brief notations of the code measurements or requirements represented by the respective indicia.

Figure 8:
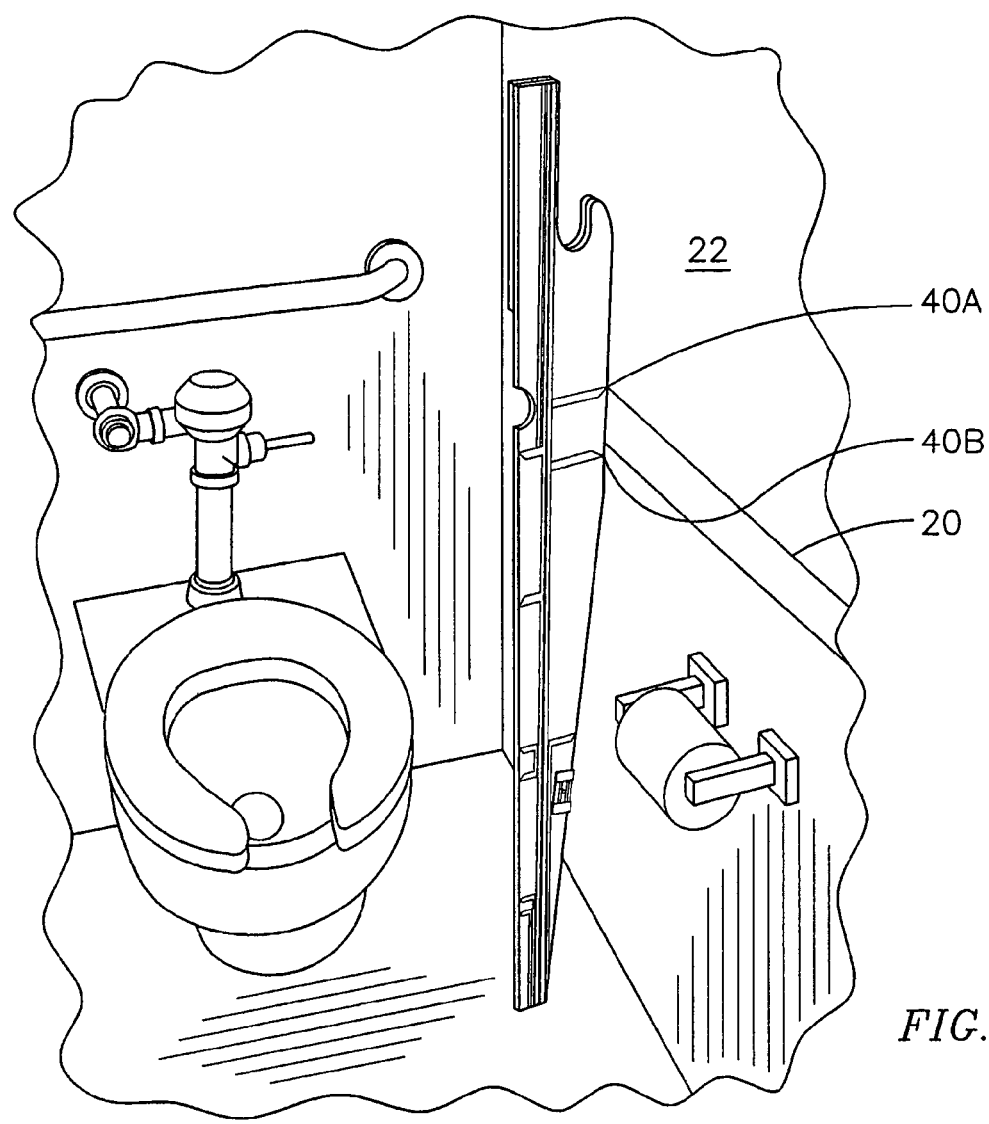
FIG. 8 is a perspective view of the invention used to measure the height of a grab bar within a washroom.

For example, indicia 40A and 40B shown in FIG. 7 respectively represent a minimum and maximum height of a grab bar 20. With respect to FIG. 8, The tool 10 is shown measuring the height of a grab bar 20 within washroom. The grab bar 20 is shown to be above the minimum height requirement 40A and below the maximum height requirement 40B, therefore, in compliance with the appropriate code. The ADA codes require the garb bar 20 must have a minimum height of thirty-four inches measured from the floor of the washroom, and a maximum height of thirty-six inches measure from the floor of the washroom.

Figure 9:
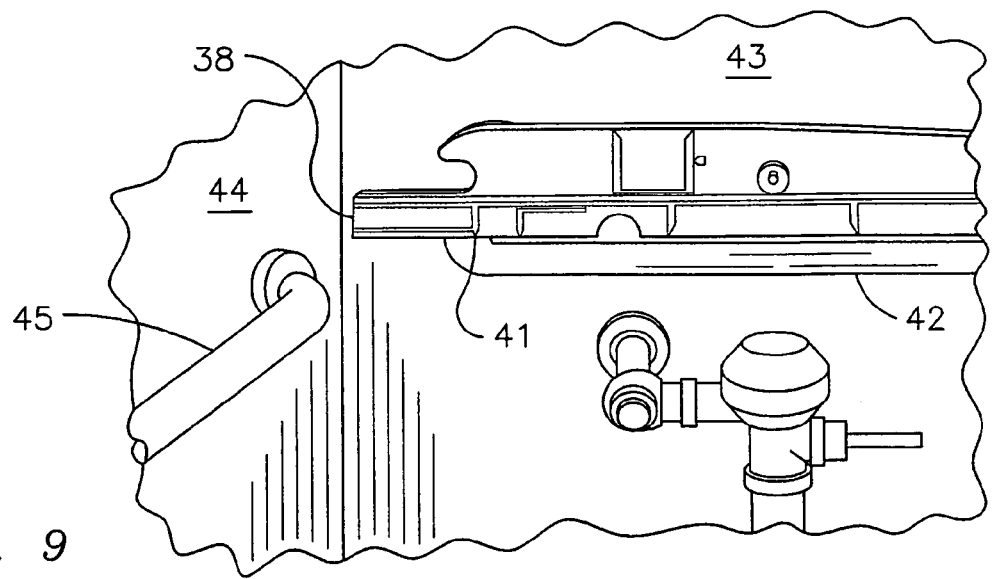
FIG. 9 is a perspective view of the invention used to measure the distance of the grab bar on a rear wall is spaced from a side wall in a washroom.

In addition, one or more of the indicia may be used to measure compliance with more than one code standard and/or more than one construction component. For example an indicia may be spaced a fast predetermined distance from the straight edge 38, and spaced a second predetermined distance from the straight edge 39 in order to take more than one measurement for one or more different components or features. For example, the length of the planar member measured from straight edge 38 to straight edge 39 may be forty-eight inches. Indicia 41, as shown in FIGS. 7 and 9, provide code standards for the spacing of a grab bar 42, mounted on a rear wall 43, from a sidewall 44 of a washroom. The ADA code requires that the end of the grab bar 42 be spaced a maximum distance of six inches from the sidewall 44.

Figure 10:
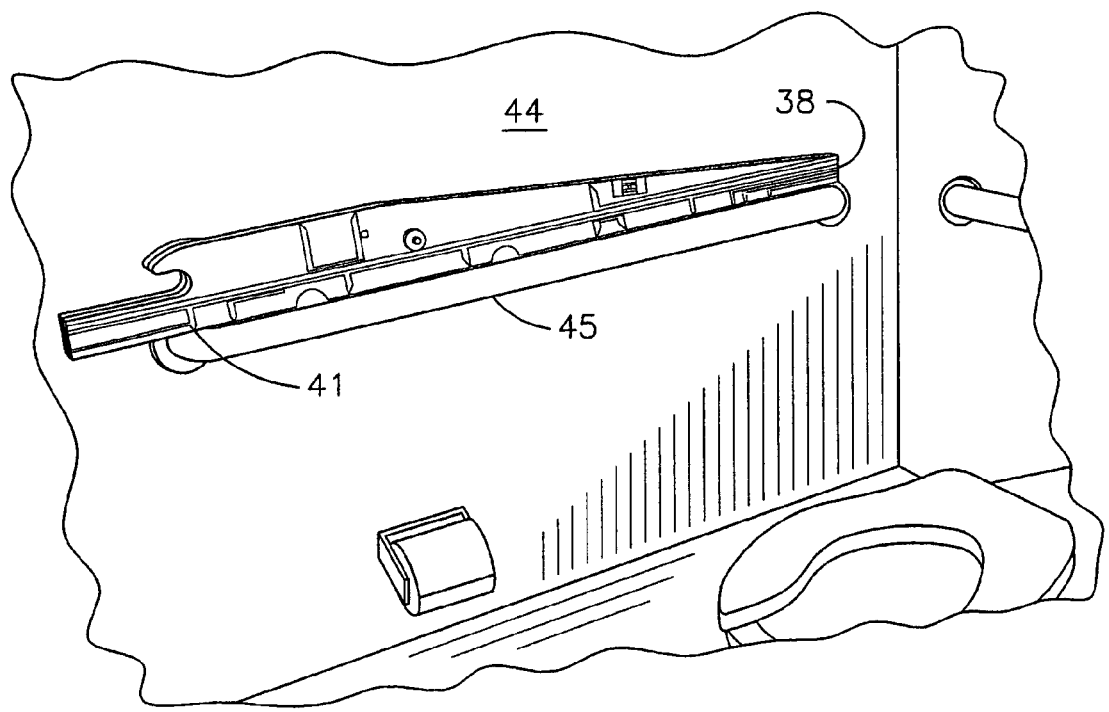
FIG. 10 is a perspective view of the invention used to measure the length of a grab bar on a wash room side wall in a washroom.

As shown in FIG. 10, indicia 41 may also be used to determine whether the length of a side grab bar 45 complies with code standards. The ADA code requires that the grab bar 45 mounted on a sidewall 44 of a washroom shall be at least forty-two inches in length. As described above, indicia 41 is positioned six inches from edge 38; therefore, on a forty-eight inch planar member, indicia 41 is positioned forty-two inches from edge 39. Accordingly, indicia 41 is used to take two measurements including the length of a side grab bar 45 as shown in FIG. 10, and the distance the rear grab bar 42 is spaced from sidewall 44 as shown in FIG. 9.

Figure 11:
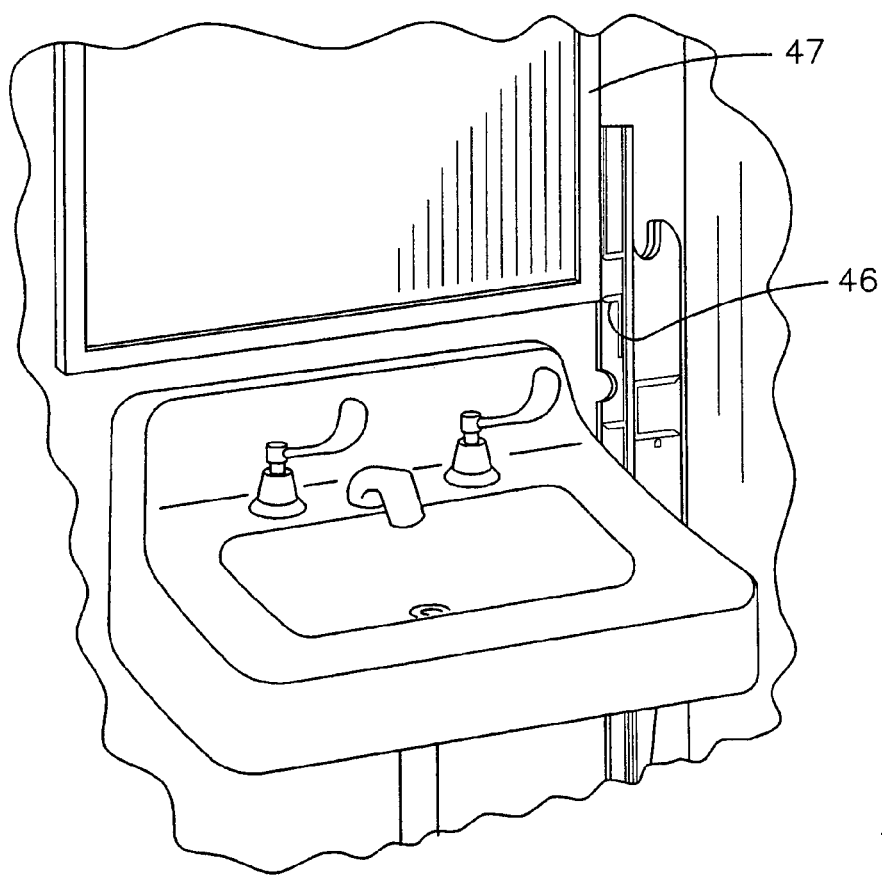
FIG. 11 is a perspective view of an embodiment of the invention measuring the height of a mirror within in a washroom.

As shown in FIGS. 7 and 11, indicia 46 represents the code standard for the maximum height, forty inches, of the bottom of a lavatory mirror 47 from the floor of an ADA compartment. Accordingly, the indicium 46 is spaced forty inches from the straight edge 39 (not shown) of the planar member 35.

Figure 12:
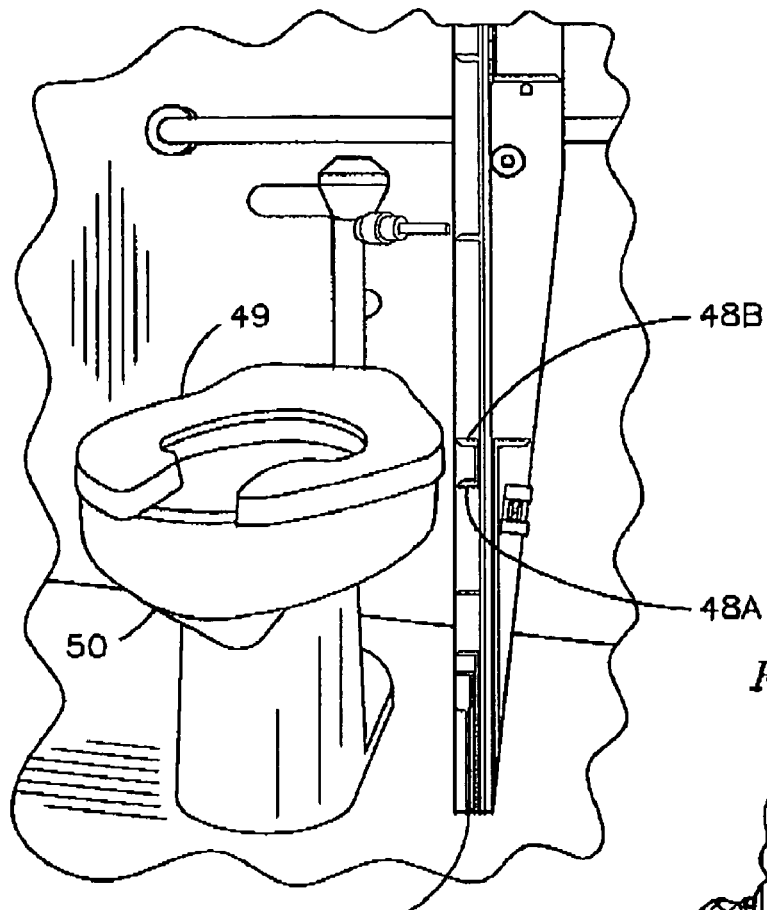
FIG. 12 is a perspective view of the invention used to measure the height of a seat on a water closet.

With respect to FIGS. 7 and 12, indicia 48A and 48B, respectively, represent minimum height and maximum height of a scat 49 on a water closet 50. The tool 10, shown in FIG. 7, includes other indicia representative of code standards for washroom accessories and fixtures. Indicium 51 represents a maximum height of the flood rim of a lavatory (sink), which by ADA code standards is thirty-four inches. Indicia 52 represents a minimum knee space from the floor of a washroom to the bottom of a lavatory, which by ADA code standards is twenty-seven inches. In addition, indicium 53 represents a maximum distance (e.g. twelve inches) a side grab bar 45 is spaced from a rear wall 43 in a washroom.

The indicia 54, 55 and 56 represent code standards pertaining to the knee and toe space underneath a washroom lavatory. For example indicia 54 represents a minimum clearance of nine inches from the floor underneath a lavatory, indicia 55 represents an eight inch minimum knee clearance measured from the front of the lavatory toward the rear wall of a washroom. Indicia 56 is the maximum distance or minimum distance a fixture may extend forward of the rear wall of a washroom. The indicium 57 represents a minimum height of a toilet paper dispenser.

Figure 13:
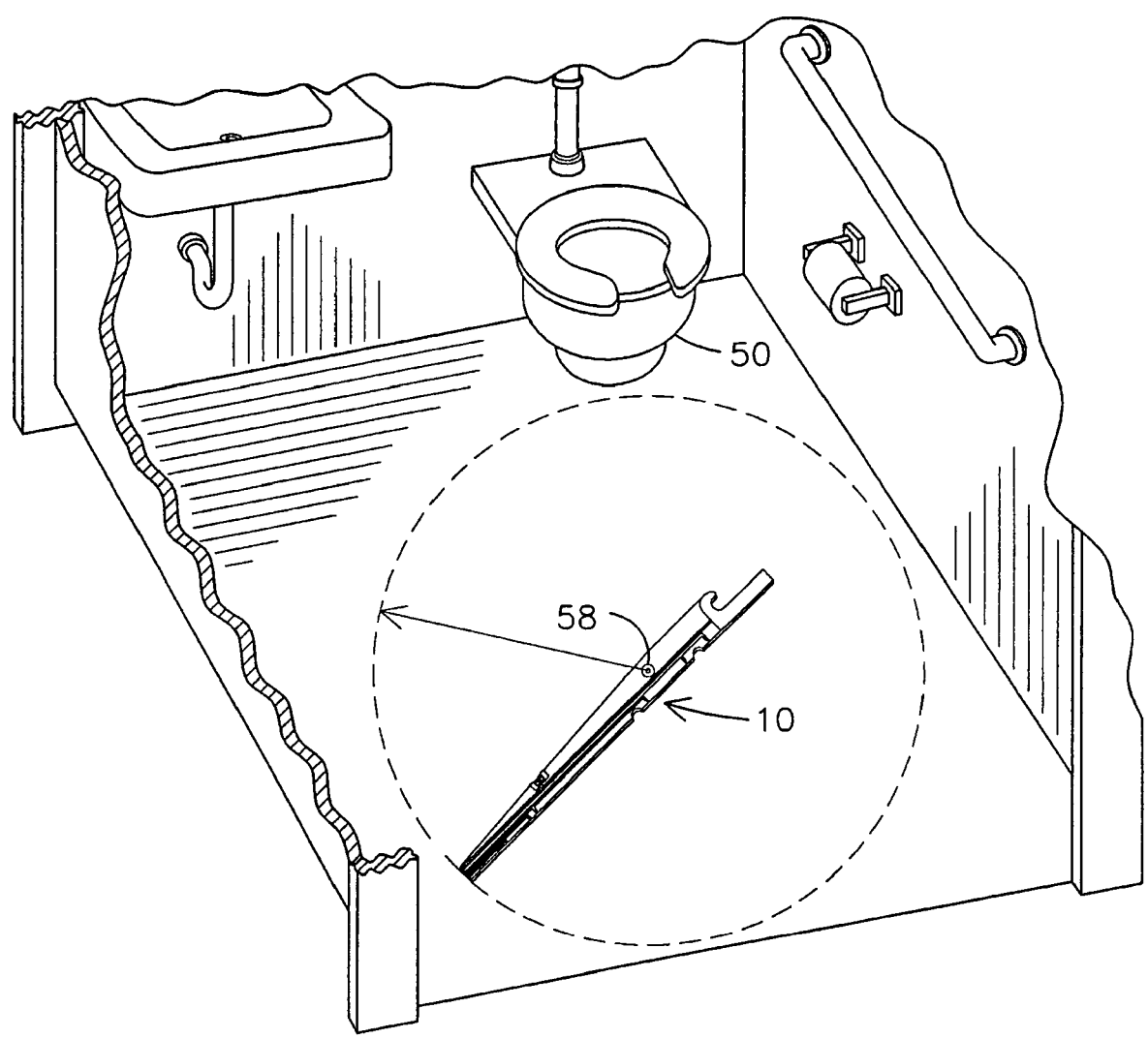
FIG. 13 is a perspective view of the invention measuring a five-foot diameter clear space for a wheelchair.

With respect to FIGS. 6, 7 and 13, the planar member 35 has an indicator 58 that is operatively connected to the planar member 35 to measure the clearance area within a washroom for operation of a wheelchair. The ADA regulations require a circular clearance area, having a five-foot diameter, within a washroom. In a preferred embodiment, the indicator 58 is positioned 2½ feet from either the first end 26 or second end 27 of the tool 10, which is rotatable with respect to the indicator 58 and about a vertical axis of the indicator 58. While the indicator 58 is shown positioned on the faces 36 and 37, the invention is not intended to be so limited. For example, the indicator 58 could be mounted on a side edge of the tool 10, or to an end 26 or 27 of the planar member.

The indicator 58, shown in FIGS. 6, 7 and 13, includes two suctions cups, each cup is operatively connected to a respective face 36 and 37 of the planar member 11. An aperture (not shown) is drilled through the planar member at a point 2½ feet from either end 26 or 27, and the two suction cups are attached to one another through the aperture. The tool 10 is rotatable about the interconnection of the two suction cups, and a vertical axis of the indicator 58. As shown in FIG. 13, the indicator 58 is secured to the floor 59. In the illustrated embodiment, the suction cups provide the necessary attachment to the floor 59. The planar member 11 is then rotated about vertical axis 60 to define the circular clearance area having a five-foot diameter.

Figure 14:
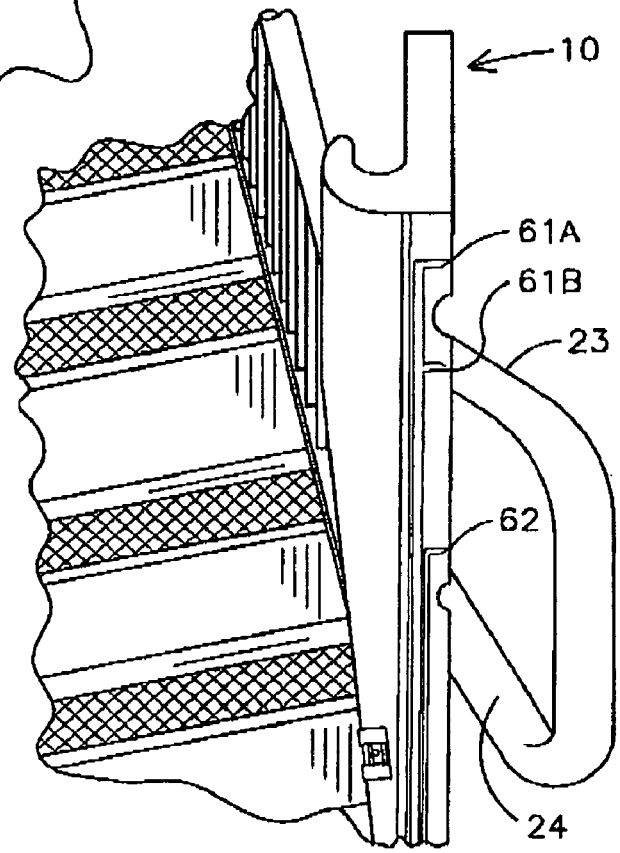
FIG. 14 is perspective view of the invention used in measuring the height of handrails on a staircase guard rail.
Figure 15:
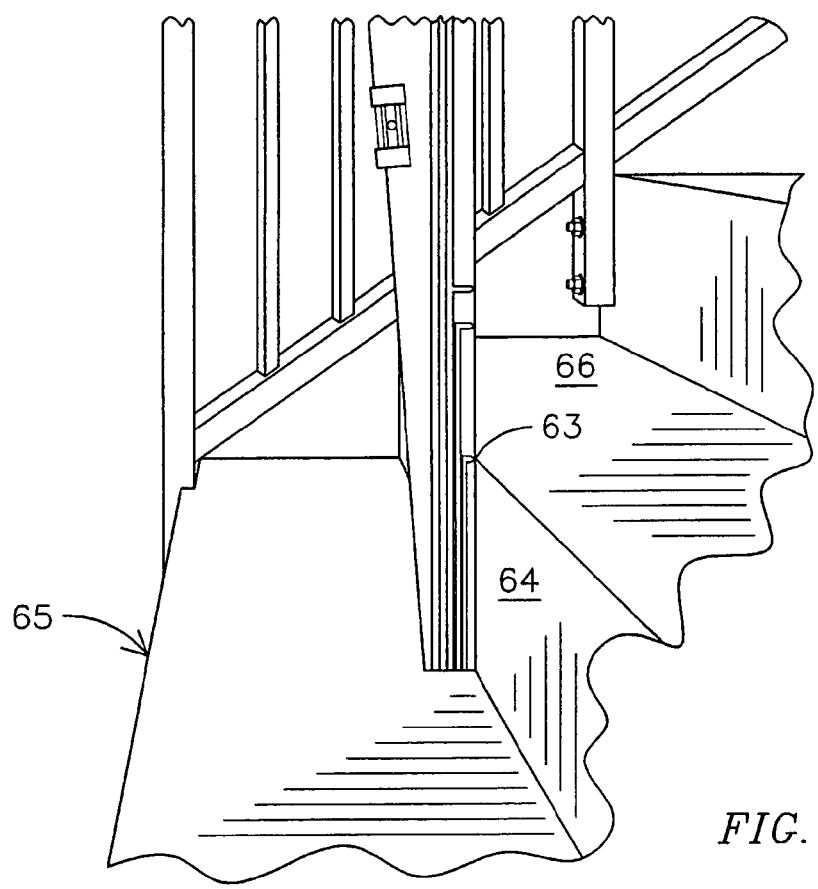
FIG. 15 is a perspective view of the invention used to measure the height of a riser of step on a staircase.

With respect to FIGS. 14, 15 and 16, the tool 10 is shown measuring spatial dimensions of access areas. As shown in FIGS. 6 and 14, indicia 61A represents the maximum height of a handrail 23, on a stairway or ramp, and indicia 61B represents a minimum height of a handrail 23. Indicia 61A is spaced thirty-eight inches from the edge 39 and indicia 61B is spaced thirty-four inches from the edge 39. In addition, indicia 64 represent a maximum height, twenty-seven inches of a return rail 24, as shown in FIG. 14.

As shown in FIG. 15, indicium 63 represents the maximum height of a riser 64 of a stair step 65. The ADA code or regulations require that the riser 62 at most seven inches high. In addition, the tread 66 of a stair step 65 must have a minimum width or depth of eleven inches, which measurement is represented by indicia 67 shown in FIG. 3. Yet another measurement related to access areas of buildings is indicia 68 which represents a measurement of a handrail extension at the end of a staircase, which must extend a minimum of twelve inches beyond the end of the staircase. Alternatively, or in addition, indicia 68 may be spaced eighteen inches to represent a maximum extension of a handrail on a ramp.

While the preferred embodiments of the present invention have been shown and described herein, it will be obvious that such embodiments are provided by way of example only. For example, the invention is not limited to the specific code measurements described above, which are provided as an example of the novel field tool. Numerous variations, changes and substitutions will occur to those of skill in the art without departing from the invention herein. Accordingly, it is intended that the invention be limited only by the spirit and scope of the appended claims.

I claim:

1. A tool for measuring spatial dimensions of access areas for buildings, and for determining compliance with codes which set forth the standards for such spatial dimensions, comprising:
    (a) a planar member having an outer edge; and
    (b) a first indentation having a diameter representative of a maximum diameter permitted by codes for handrails or grab bars and a second indentation having a diameter representative of a minimum diameter for handrails or grab bars permitted by the codes wherein the first indentation is positioned with respect to the second indentation to simultaneously measure compliance with the minimum diameter code standard and the maximum diameter standard for handrails and grab bars.

2. The tool of claim 1 wherein the planar member is elongated having a first end and a second end distal to the first end and at least one straight edge extending there between, the indentations are formed in the straight edge of the planar member, or one of the first end or second end of the planar member.

3. The tool of claim 2 further comprising a plurality of indicia on a surface of the planar member and each such indicia is spaced a predetermined distance from the first or second end of the elongated planar member and each indicia representative of a respective dimension standard as set forth in the codes.

4. The tool of claim 1 wherein the first indentation and second indentation are disposed on the second end of the planar member and a tab extends adjacent to the indentations, and the tab having a width representative of a minimum distance a handrail or grab bar is spaced from a wall, and the indentations and tab are oriented with respect to one another so the handrail or grab bar diameter and the distance a handrail or grab bar is spaced from a wall can be measured simultaneously.

5. The tool of claim 4 wherein the second end or first end of the planar member has a predetermined width that is equal to a maximum spacing between consecutive balusters on a railing as permitted by the codes.

6. The tool of claim 1 wherein the planar member is at least two and a half feet long, and an indicator is operatively connected to the planar member to represent a point of origin for measuring a five-foot diameter clearance circle on a floor within a washroom.

7. The tool of claim 6 wherein the indicator comprises a suction cup to secure the planar member to the floor to represent the point of origin of the clearance circle and the planar member is rotatable with respect to the indicator.

8. A tool for measuring spatial dimensions of access areas for buildings, and for determining compliance with codes which set forth the standards for such spatial dimensions, comprising:
    (a) a planar member having an outer edge, and a first face and second face disposed within the outer edge;
    (b) at least one indentation formed in the outer edge extending through the first face and second face wherein the indentation is positioned adjacent a handrail or grab bar, extending transversely with respect to the first face and second face of the planar member;
    (c) the indentation having a diameter representative of a maximum diameter code standard for handrails or grab bars, or representative of a minimum diameter code standard for handrails or grab bars to measure compliance of the diameter of the handrail or grab bar with the codes; and
    (d) wherein the outer edge having a top edge and a bottom edge, and two opposing side edges, and the indentation is formed along the top edge disposed between the side edges forming a tab adjacent to the indentation and the tab having a width representative of a minimum distance a grab bar or handrail is spaced from a wall as permitted by the codes, the indentation and tab are oriented with respect to one another so the handrail diameter, or grab bar diameter, and the distance between the handrail, or grab bar, from a wall can be measured simultaneously.

9. The tool of claim 8 wherein the two opposing side edges define a predetermined width representative of a maximum spacing between consecutive intermediate rails of a guardrail, or a maximum dimension of an opening in an ornamental design of a guardrail, as permitted by the codes.

10. A method for measuring compliance of spatial dimensions of components of a building access area or washroom with building construction codes, comprising the steps of:
    (a) providing a tool having at least one indentation having a diameter that is representative of a minimum diameter or maximum diameter of a handrail or grab bar as permitted by the codes, and a first indentation having a diameter representative of a minimum diameter code standard for a handrail or grab bar, and a second indentation having a diameter representative of a maximum diameter code standard for a handrail or grab bar, and the first and second indentations are positioned with respect to one another to simultaneous measure compliance with the minimum diameter code standard and maximum diameter code standard; and,
    (b) placing the tool against a handrail or grab bar and the indentation adjacent the handrail or grab bar to measure compliance of the diameter of the handrail or grab bar with code standards.

11. The method of claim 10 wherein the step for providing the tool includes providing the tool with a tab for measuring compliance for a code standard for a minimum distance a handrail or grab bar is spaced from a wall, and further including the step of simultaneously inserting the tab between the handrail, or grab bar, and positioning the indentation adjacent the handrail or grab bar to simultaneously measure compliance with the diameter code standard for the handrail or grab bar, and the code standard for the distance the handrail or grab bar is spaced from the wall.

12. The method of claim 10 wherein the step for providing the tool includes providing a tool having a predetermined width, measured from one side edge of the tool to another side edge of the tool, and the predetermined width representative of a code standard for the maximum distance consecutive balusters of a guardrail are spaced apart, and further including the step of positioning the tool adjacent to consecutive balusters on a guard rail to compare the spacing between the balusters to the predetermined width of the tool, to measure compliance with the code standard.

* * * * *